Figure 1:
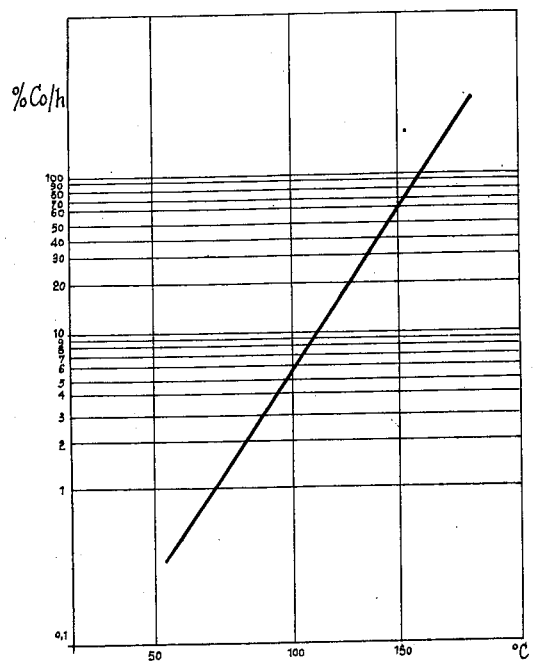

July 21, 1964   E. P. FIVEL   3,141,868
PROCESS FOR CONTINUOUS MASS POLYMERIZATION OF VINYL DERIVATIVES
Filed May 11, 1959   2 Sheets-Sheet 1

INVENTOR:
ERNEST PAUL FIVEL
By
Richardson, David and Nordon
Atty's.

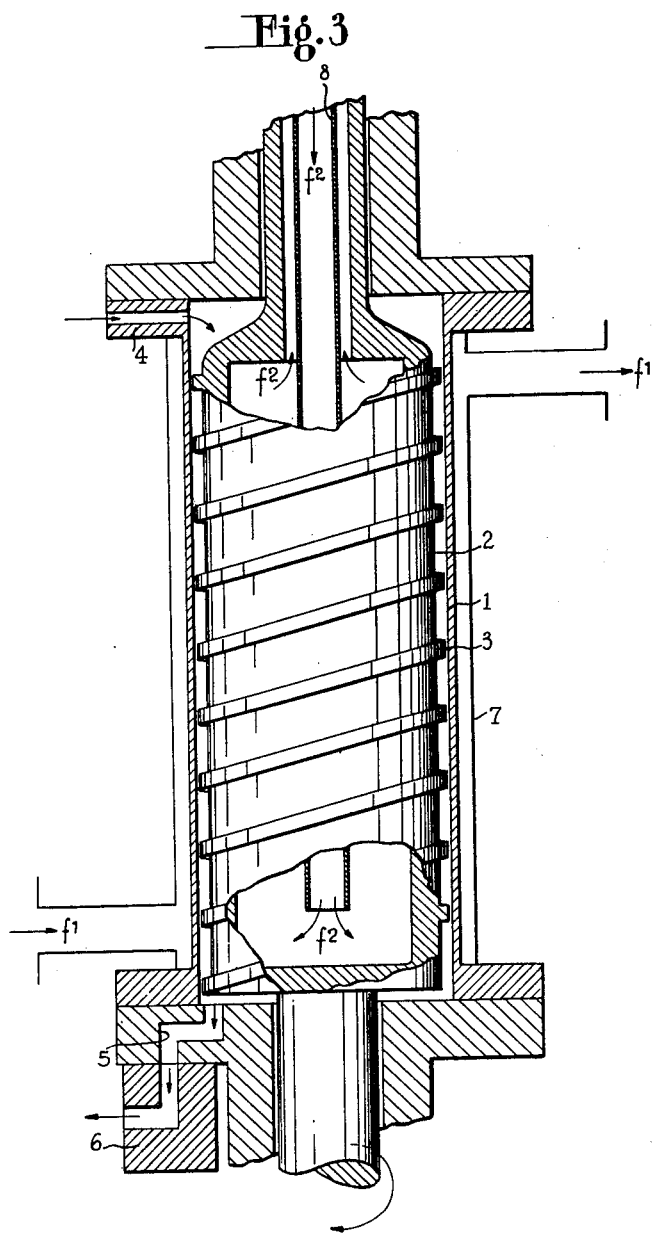

United States Patent Office 3,141,868
Patented July 21, 1964

3,141,868
PROCESS FOR CONTINUOUS MASS POLYMERIZATION OF VINYL DERIVATIVES
Ernest Paul Fivel, Saint-Rambert-l'Ile-Barbe, France, assignor to Resines et Vernis Artificiels, Paris, France, a corporation of France
Filed May 11, 1959, Ser. No. 812,391
Claims priority, application France May 16, 1958
2 Claims. (Cl. 260—85.5)

The present invention relates to the polymerization of vinyl derivatives of mouldable or extrudable thermoplastic materials, the expression polymerization herein designating both simple polymerization and copolymerization.

At the present time, various processes of polymerization exist in which it is attempted to obtain a compromise between the various factors influencing the molecular weight of the polymers so as to obtain in practical working conditions polymers which are satisfactory as concerns their moulding possibilities and their mechanical characteristics.

It is known, for example, that the moulding possibilities are for the major part a function of the molecular weight of the polymers, which in turn is determined by the adopted mode of preparation.

Thus, resins whose mean molecular weight is relatively high are the most difficult to mould since they require very long moulding cycles. On the other hand, polymers having a low molecular weight are easy to mould but result in products having poor mechanical properties. It is common knowledge that all products of the properties of which give most satisfaction, have molecular weights, expressed in "$k$-Wert," which are situated approximately between 50 and 80.

(As is known, this notion of "$k$-Wert" was introduced by H. Fikentscher, Cellulosechemie 13, 58 (1932), and it has entered into current use as a convenient measure of the mean molecular weight of polymers.)

The "$k$-Wert" or "$k$ value" is influenced by the reaction temperature, it being possible to determine the extreme temperatures experimentally in each case within which extreme temperatures an appropriate $k$ value is obtained, all other conditions remaining equal.

However, this adjustment of the molecular weight by the reaction temperature is subject to limitations since the reaction rate increases with the temperature so that at high temperatures there is obtained a polymerization which is so exothermic that its progress is uncontrollable under present conditions.

A first type of process, in which dispersing or solvent media are used and perform the function of a thermic reserve, has therefore been perfected the prototype of which is the polymerization in an aqueous emulsion. The main argument in favour of such processes consists in a greater facility of thermal exchange associated with a well homogeneous presentation of the reaction medium. However, this type of operations is affected by all the following drawbacks: the masses admitted into the reaction zone are considerable relative to those of the polymers obtained; the product is soiled with different impurities which are difficult to eliminate and come from foreign substances it was necessary to introduce into the medium so as to render the reaction in a dispersed phase possible (wetting, dispersing and protective agents). It frequently occurs, furthermore, that the molecular weights reached in this way are distinctly too high for satisfying good moulding conditions. The same remarks apply to processes using solvents and catalyzers which must moreover be considered as foreign substances having an unfavourable influence on the $k$ value.

Since the addition of foreign substances always more or less profoundly alters the final polymer—whether the operation is carried out in a dispersed phase, by means of the above-mentioned substances or in solution, that is, with a catalyzer and a solvent which operate as true modifying agents—it is finally processes of mass polymerization which must provide the best products and meet with the greatest favour on the part of practitioners. However, the inherent difficulty in mass polymerization processes resides in the highly exothermic character of the reaction in question. Processes known up to the present time have avoided the difficulty. Various modes of operation have been suggested. Some recommend operating in a discontinuous manner but on very small charges so as to have a greater control of the exothermic character of the reaction, which is of little interest from the economical point of view. Others effect the reaction in a continuous system on large charges in the presence, or not in the presence, of regulating substances but at a low temperature so as to avoid any possibility of the reaction getting out of control, which requires very long reaction times of about several days. In view of the large charges operated upon, this process could present serious risks and moreover appears unsatisfactory from the economical point of view in view of the duration of the reaction.

It has also been suggested to avoid both an intense exothermic character of the reaction medium and such an increase in its viscosity that it is no longer able to travel through the zone, this result being obtained by a continuous mass operation at high temperature within a very short reaction time and a very high passage speed, that is, at a very small yield per cycle (of about 2 to 5%). The drawback in this process resides in the very high number of recycles accompanied by an almost total distilling off of the monomers at the end of each cycle, it requiring moreover a very precise re-adjusting system for a very low energy efficiency of the polymerization apparatus.

Thus, all the polymerization processes known at the present time have serious drawbacks which the object of the present invention is to remedy. The invention provides for this purpose a continuous mass polymerization process for polymerizing vinyl derivatives which permits effecting the reaction in a single passage at a high reaction rate and with a high conversion yield.

It has been discovered that these results can be obtained on condition that the reaction medium formed of the monomer or monomers to polymerize is presented in the form of thin layers between two diathermic walls so as to eliminate progressively and under satisfactory conditions of heat exchange the heat formed in the course of this reaction. The various conditions upon which it is possible to act in this process are interdependent. Thus, for each monomer or monomer system there exists a range of reaction temperatures which ensures that the polymer has an appropriate $k$ value between 50 and 80. Within this range there is a narrower range which corresponds to a reaction rate which is allowable in practice, that is, gives a conversion ratio which is satisfactory for a non-prohibitive reaction time. Practically, it could be assumed that the required conversion ratio should be at least 30%, and preferably between 30 and 80%, for a reaction time of 15 minutes to 3 hours, and preferably about 1 hour. Bearing in mind these factors, it is possible to determine experimentally for each particular monomer or monomer system the appropriate thickness of the thin layers to use.

The process of the invention comprises continuously passing between two diathermic walls the monomer or monomers to be polymerized in the form of a thin layer during 15 minutes to 3 hours, and preferably in the neighbourhood of 1 hour, at such reaction temperature that the $k$ value according to Fikentscher of the polymer obtained is between 50 and 80 and that the corresponding reaction rate ensures a conversion ratio of at least 30% and preferably between 30 and 80% into polymer during the reaction time.

The thickness of the layer could be estimated from the minimum allowable ratio $S/e$ between the total heat exchange surface S and the thickness $e$ of the layer between two diathermic wall elements for a unit volume of the reaction medium. As mentioned hereinbefore, it is not possible to give a single value $S/e$ which is suitable for all the vinyl derivatives to which the process of the invention applies, since this value varies with the various monomers used. This value could however be easily determined experimentally on the basis of the principles herein set forth. There will furthermore be given hereinafter a concrete example of how this value is determined in the particular case of styrene-acrylonitrile copolymers.

It is known that copolymers containing approximately 65 to 95 parts by weight of styrene (in particular 72 parts) and 35 to 5 parts of acrylonitrile (in particular 28 parts) have the property of giving resins which are resistant to solvents and to attack by certain liquids (alcohol, water, petrol, diluted alkalis and acids) and are inflatable and/or dispersible in certain other liquids such as methyl-ethyl-ketone, etc. The copolymers obtained possess good properties of transparence, lustre and high mechanical strength and are easily moulded. Thus, it is due to their practical interest that these copolymers have been chosen as examples.

To determine the appropriate ratio $S/e$, investigations were made as concerns the influence of the reaction temperature on the $k$ value of the copolymer obtained and on the reaction rate in the case of a mixture of 72% styrene and 28% acrylonitrile under good heat exchange conditions.

The following Table I summarizes the results obtained.

TABLE I

*Initial Copolymerization Rate and k Value as a Function of the Temperature (72% Styrene+28% Acrylonitrile)*

| Test | Polymerization temperature (° C.) | k value | Initial ratio of the copolymer formed (percent/hour) |
|---|---|---|---|
| a | 70 | 103 | 1.3 |
| b | 80 | | 1.9 |
| c | 90 | | 3.4 |
| d | 100 | 95 | 6.8 |
| e | 110 | | 11.8 |
| f | 120 | 83 | 16.5 |
| g | 130 | | 25.0 |
| h | 140 | 76 | 41.5 |
| i | 150 | 71 | 70 |
| k | 170 | 65 | 150 |

From this table it can be deduced that to obtain a suitable $k$ value between 50 and 80, and more precisely between 60 and 70, it is necessary to select a reaction temperature between 130 and 180° C.

Further, it is quite clear that it is at these temperatures that the reaction rate becomes such that the exothermic character of the reaction must be effectively combatted. Thus, at 150° C. (test $i$) the concentration of copolymer with respect to the charge increases to the extent of some 1.2% per minute, that is to say, for 100 kg. of initial monomer charge there must be a continuous elimination of about 250 kcal. per minute.

FIG. 1 of the accompanying drawing shows the curve of the reaction rate as a function of the temperature. The inverse of the absolute temperature has been plotted as abscissae (the scale has however been rewritten as ° C.) and the copolymer percentage formed per hour (percent copolymer/hour) has been plotted as ordinates according to a logarithmic scale. This curve is—taking into account inevitable experimental errors—a straight line satisfying the formula:

$$\text{Reaction rate (percent } h) = 2.918 \cdot 10^9 \cdot 10^{-\frac{3233}{T}}$$

wherein T is the absolute temperature in ° K.

The reaction is therefore of the first order and the logarithmic straight line thus plotted represents the progress of the heat exchange under the best conditions.

Now it is precisely the obtainment of these optimum heat exchange conditions which is delicate. The series of tests summarized in the Table II with variable heat exchange surfaces has shown that these optimum conditions were obtained if sufficient heat exchange surfaces were provided, the area of which is related to the thickness of the reaction medium; in this way any overheating in this medium, any disturbance at the reaction rate, any risk of the reaction getting out of control and any modification of the characteristics of the final copolymer are avoided.

More precisely, this defines the ratio $S/e$ between the total heat exchange surface S offered to unit volume of the mass in reaction and the thickness of the layer between two diathermic wall elements, the dimensional equation of this ratio being expressed:

$$(L)^{-3}\left(\frac{L^2}{L}\right) = (L)^{-2}, \text{ that is cm.}^{-2} \text{ in c.g.s.}$$

TABLE II

*Variation in the Copolymer Conversion Ratio as a Function of the Ratio Between the Heat Exchange Surface and the Thickness of the Product at the Temperature of 150° C.*

| $\frac{S}{e}$ (in cm.$^{-2}$) | Conversion ratio (percent) after 30 minutes |
|---|---|
| 8 | 45 |
| 4 | 45 |
| 1.5 | 45 |
| 1 | 46 |
| 0.75 | 48 |
| 0.4 | 55 |
| 0.1 | 70 |

Figure 2:
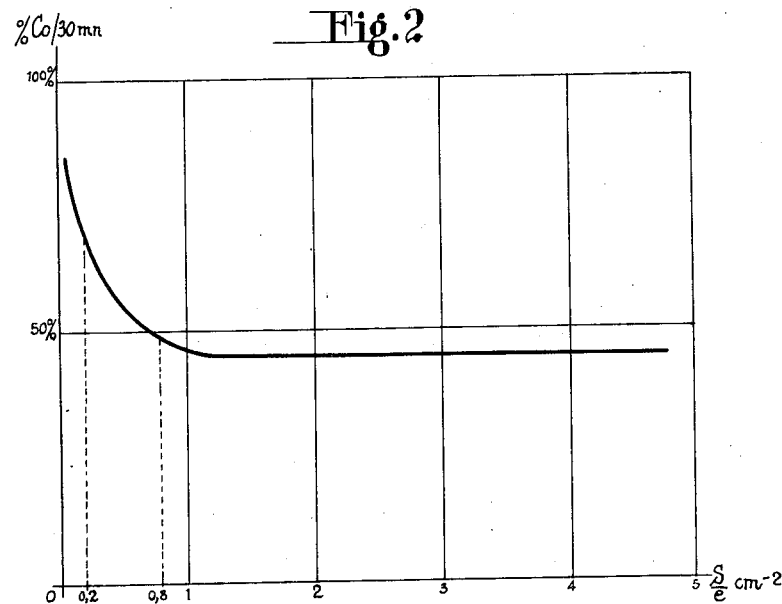

FIG. 2 of the accompanying drawings shows the results of this table. The ratio $S/e$ in cm.$^{-2}$ has been plotted as abscissae and the conversion ratio after 30 minutes (percent copolymer/30 min.) as ordinates. The minimum allowable ration $S/e$ can be deduced from this curve. This curve has a flat portion and a portion asymptotic to the axis of the ordinates. To have a controllable reaction, it should not be situated too distinctly on the asymptotic portion. This corresponds to $$\frac{S}{e} \geq 0.2 \text{ cm.}^{-2}$$

this ratio being preferably equal to 0.8–1.

To obtain such ratios $S/e$ a suitable polymerization apparatus is constituted by a polymerizer having an annular space for the passage of the monomers which is adjusted to a suitable value. Such a polymerizer is shown in longitudinal section, with parts cut away, in FIG. 3 of the accompanying drawings. It comprises two concentric cylinders 1 and 2, the inner cylinder 2 being rotatable within the cylinder 1 and provided with a helical rib or thread 3 which urges the mixture of monomers through the annular space provided between the cylinders. This mixture is injected through an inlet 4 and issues from the apparatus through an outlet 5, an extracting pump 6 being provided if desired.

Intermediate the inlet 4 and outlet 5, the helical ribs or threads 3 and the concentric cylinders 1 and 2 constrain the material to assume the form of a continuous sheet. The thickness of this sheet is determined by the radial spacing between the concentric cylinders 1 and 2, the width of the sheet being determined by the pitch between adjacent convolutions of the helical ribs or threads 3. The sheet thus assumes the configuration of a cylindrical helix, material being fed into one end of the sheet adjacent to inlet 4 while material is withdrawn from the other end adjacent to outlet 5.

The cylinder 1 is surrounded by a jacket 7 in which a heat regulating fluid circulates in the direction of the arrows $f^1$. The cylinder 2 is hollow and heat regulating fluid circulating in the direction of arrows $f^2$ can also be injected therein through the pipe 8.

A simple calculation will show that in such an apparatus the ratio $$\frac{S}{e} \text{ is equal to } \frac{2}{(R-R')^2}$$

wherein R and R' are the radii of the cylinders 1 and 2 respectively and (R—R') is the thickness of the sheet.

It is possible to deduce $R-R' \leq 3.2$ cm. The lower limit of the sheet thickness (R—R') is determined by practical considerations, since it is hardly possible to go below 0.2 cm. Thus, a plurality of interchangeable cylinders 2 could be provided, whereby it is possible to obtain a series of different sheet thicknesses within the range between 3.2 and 0.2 cm.

Thus, as mentioned hereinbefore, there is no point in exceeding at the output end of the apparatus a polymerization ratio greater than 80% for two reasons:

(1) Above 80% the reaction rate becomes very low resulting in a drop in the efficiency of the apparatus.

(2) Above 80% the product becomes very viscous and cannot be easily displaced.

Thereafter at the output end of the apparatus the product is fed into a devolatilizing apparatus of conventional type. The excess monomers distilled off are fed back to the polymerizer and the copolymers extracted.

Under preferred conditions of operation, it is therefore possible to obtain in about one hour polymerization ratios of about 80% with the minimum of handling. The following examples illustrate the invention, it being understood that the scope of the latter is not limited to these examples.

*Example 1*

The monomers styrene and acrylonitrile, in 72 and 28 parts by weight respectively, are sent by means of a metering pump at a pressure of 5 kg./sq. cm. into a polymerizer of the described type, whose reaction space is constituted by an annular space of 5 mm. The temperature of the reaction mixture is regulated at 150° C. by circulation of the regulating fluid at 145° C. By means of the screw pump disposed at the output end of the polymerizer, the time during which the monomers remain in the space of the apparatus is adjusted to 55 minutes. The mixture of copolymer and unconverted monomers is fed to the devolatilizing apparatus; the latter operates at 220° C. under a residual pressure of 30 mm. of mercury.

The copolymer is collected at the output end of the devolatilizing apparatus and it is observed that the volatile material is about 0.7%. The conversion ratio of the monomer mixture during this passage time in the reaction space was found to be 73% of formed copolymer, such a conversion ratio corresponding to a copolymer formation rate equal to 1.33%/min. The $k$ value according to Fikentscher, which is the characteristic of the molecular weight, was found to be 70.

The copolymer obtained is colourless, transparent, clear and possesses satisfactory mechanical properties.

*Example 2*

The styrene and acrylonitrile monomers, previously adjusted to the proportion of 72 to 28, are fed at a pressure of 5 kg./sq. cm. to a polymerizer whose temperature is regulated at 170° C. by circulation of a regulating fluid at 165° C. The screw pump placed at the output end of the polymerizer permits adjusting the passage time to about 20 minutes. The mass constituted by the copolymer and the unconverted monomers is fed to the devolatilizing apparatus which operates under the conditions mentioned in respect of the preceding example.

The copolymer collected at the output end of the devolatilizing apparatus contains less than 0.6% of volatile material. The conversion ratio was found to be 67% and the copolymerized product formation rate is therefore about 3.2%/min. The $k$ value is equal to 65.

Well-known modifying agents could also be used for modifying, if necessary, the molecular weight of the copolymers formed. Example 3 hereinafter illustrates this modification.

*Example 3*

The monomers previously adjusted to the proportion 720 g. of styrene for 280 g. of acrylonitrile are mixed with 0.05% of dodecylmercaptan. This mixture is then fed at a pressure of 5 kg./sq. cm. to a polymerizer maintained at a temperature of 150° C., the fluid of the double wall or sleeve being maintained at 145° C. The passage time in the apparatus is adjusted to 55 minutes by means of the screw pump disposed at the output end of the polymerizer.

The product obtained, once it has been devolatilized under the conditions mentioned with respect to the previous examples, has about 0.7% of volatile material. The conversion ratio was found to be 72%, corresponding to a copolymer formation rate equal to 1.2%/min. The $k$ value according to Fikentscher is 61.

Although specific examples of the invention have been described it must be understood that the scope of the invention is not limited thereto. Thus, although the invention has been illustrated in respect of its application to the styrene-acrylonitrile copolymer it is also applicable to all vinyl monomers or copolymers.

Having now described my invention what I claim as new and desire to secure by Letters Patent is:

1. A method for the copolymerization of styrene and acrylonitrile, said styrene and acrylonitrile constituting the two reactants of an exothermic reaction, said method comprising the steps of:

(a) forming a mixture consisting of said reactants in monomeric form in proportions, respectively, of from 95–65 and 5–35 percentage parts by weight;

(b) shaping a portion of said mixture into a continuous sheet configuration having a thickness in the range from 0.2 to 3.2 centimeters;

(c) continuously feeding said mixture into one end of said sheet configuration while withdrawing material from the other end thereof;

(d) continuously contacting both faces of said sheet configuration throughout their entire areas to transfer heat away therefrom;

(e) adjusting the rate of heat transfer away from said sheet configuration to maintain the temperature of all of said mixture within said configuration including copolymerized portions thereof at a predetermined constant value within the range from 130° C. to 180° C.;

(f) adjusting the rate of said feeding to cause passage of any specific portion of said mixture from said one end of said configuration to the other end thereof in a period of from about fifteen minutes to three hours whereby about 80% of said specific portion is reacted to produce a polymer having a molecular weight the $k$ value of which measured in Fikentscher units is within the range from 50 to 80; and (g) recovering the unreacted reactants from said material withdrawn from said other end of said sheet.

2. A method according to claim 1, wherein said configuration of said sheet is in the form of a cylindrical helix.

References Cited in the file of this patent

UNITED STATES PATENTS

| 2,102,179 | Hopff et al. | Dec. 14, 1937 |
| 2,530,409 | Stober et al. | Nov. 21, 1950 |
| 2,714,101 | Amos et al. | July 26, 1955 |
| 2,739,142 | Jones et al. | Mar. 20, 1956 |
| 2,745,824 | Melchore | May 15, 1956 |
| 2,769,804 | Hanson | Nov. 6, 1956 |
| 2,941,985 | Amos et al. | June 21, 1960 |

FOREIGN PATENTS

| 683,329 | Great Britain | Nov. 26, 1952 |